United States Patent
Bertholom et al.

(10) Patent No.: US 7,483,346 B2
(45) Date of Patent: Jan. 27, 2009

(54) DIGITAL DISK READ/WRITE DEVICE

(75) Inventors: Cedric Bertholom, Vinay (FR);
Jean-Michel Goiran, Saint Ismier (FR)

(73) Assignee: STMicroelectronics S.A., Montrouge (FR)

( * ) Notice: Subject to any disclaimer, the term of this patent is extended or adjusted under 35 U.S.C. 154(b) by 608 days.

(21) Appl. No.: 11/292,543

(22) Filed: Dec. 2, 2005

(65) Prior Publication Data

US 2006/0133227 A1 Jun. 22, 2006

(30) Foreign Application Priority Data

Dec. 3, 2004 (FR) ................... 04 52859

(51) Int. Cl.
*G11B 7/00* (2006.01)
(52) U.S. Cl. ............... 369/44.26; 369/44.28; 369/44.29
(58) Field of Classification Search .................. None
See application file for complete search history.

(56) References Cited

U.S. PATENT DOCUMENTS

| | | | |
|---|---|---|---|
| 4,972,400 A | 11/1990 | Kuwabara et al. | |
| 5,128,920 A | 7/1992 | Yamamuro | |
| 6,449,231 B1 | 9/2002 | Numata | |
| 6,914,868 B1 | 7/2005 | Redmond et al. | |
| 6,975,473 B2 * | 12/2005 | Ngo ............................ | 360/66 |
| 2001/0022700 A1 * | 9/2001 | Lacombe ..................... | 360/68 |
| 2001/0043419 A1 * | 11/2001 | Osaki .......................... | 360/55 |
| 2003/0112488 A1 | 6/2003 | Chiu et al. | |
| 2003/0117938 A1 | 6/2003 | Braitberg et al. | |

FOREIGN PATENT DOCUMENTS

| | | |
|---|---|---|
| EP | 0 913 817 A2 | 5/1999 |
| EP | 0913817 A2 | 5/1999 |

OTHER PUBLICATIONS

European Search Report from corresponding European Application No. 05111647.
French Search Report from French Patent Application 04/52859, filed Dec. 3, 2004.

* cited by examiner

*Primary Examiner*—Muhammad N. Edun
(74) *Attorney, Agent, or Firm*—Lisa K. Jorgenson; James H. Morris; Wolf, Greenfield & Sacks, P.C.

(57) ABSTRACT

A device for reading from and/or writing on a rotating disk including a mobile opto-electromechanical device placed above the disk and connected to a motherboard via a set of electric wires. The opto-electromechanical device includes actuators, a laser diode, photodetectors, and an electronic circuit, each photodetector providing the electronic circuit with an analog electric signal proportional to the received light signal, the electronic circuit controlling the diode and the actuators. The electronic circuit comprises an analog-to-digital converter digitizing the analog electric signals coming from the photodetectors and transmitting the digitized signals to a digital processing unit providing data of alignment of the opto-electromechanical device with respect to the disk, and a reference clock signal having its period substantially corresponding to a multiple or to a sub-multiple of the time period corresponding to the overflight by the opto-electromechanical device of a bit of the disk.

21 Claims, 2 Drawing Sheets

DIGITAL DISK READ/WRITE DEVICE

BACKGROUND OF THE INVENTION

1. Field of the Invention

The present invention generally relates to a device for reading from and/or writing on digital data storage disks enabling optical reading and/or writing. Such disks are for example "CDs", "DVDs", "Bluerays", or "HD-DVDs".

2. Discussion of the Related Art

FIG. 1 is a known diagram of such a device. A mobile opto-electromechanical device 1 is placed above a disk 2 on a support 3 formed of two horizontal rails held on one side by a foot 4 laid next to disk 2. Opto-electromechanical device 1 is connected to a motherboard 5 by electric wires placed on a flexible strip 6.

The opto-electromechanical device structure is schematically shown to the bottom left of the drawing. Actuators 10 enable moving device 1 on the rails of support 3. A laser diode 11 emits light to read from or write on the disk. An image sensor 12 formed of a photodetector array continuously measures the intensity of the light reflected by the disk. Each photodetector of image sensor 12 provides an analog electric signal having a magnitude substantially proportional to the intensity of the light received by this photodetector. Actuators 10, laser diode 11, and image sensor 12 are connected to an electronic circuit 13 comprising the following elements. An amplifier 14 amplifies the analog electric signals provided by each of the photodetectors of image sensor 12 and transmits them to motherboard 5 in the form of a set of analog signals s. An amplifier 15 receives control signals cmd transmitted by the motherboard and, after amplification, transmits said signals to actuators 10. A regulation/amplification device 16 controls the light intensity of laser diode 11, the light intensity being small or variable according to whether a reading or a writing is performed. In a write phase, regulation/amplification device 16 receives a digital data signal D and varies the light intensity of laser diode 11 according to the type of bit to be written, the intensity being for example high to write a "1" and low to write a "0", the writing of a bit at "1" causing a modification in the nature of the track portion corresponding to this bit and especially a modification in its reflective characteristics.

The motherboard receives or provides audio-visual signals for or from an apparatus such as a television or an audio system, and exchanges with opto-electromechanical device 1 previously-mentioned signals cmd, s, and D. Generally, motherboard 5 is a printed circuit on which are placed one or several integrated circuits. From a functional point of view, the motherboard can be divided into four main units. A "servo" unit 20 provides control signals cmd to actuators 10. A processing unit (proc RF) 21 processes the analog signals s originating from image sensor 12. Processing unit 21 provides a data signal d to a read unit R 23, which provides an audiovisual signal Se after demodulation and decoding. A write unit W receives an audiovisual signal Sr and performs a coding and a modulation of this signal, the coded and modulated signal being sent to opto-electromechanical device 1 in the form of a signal of digital data D to be written on disk 2.

Processing unit 21 analyzes the images provided by sensor 12 to detect four main elements. This analysis is performed in "analog" form with calculation means, and especially summing and subtracting means, operating from analog signals. The first two provided elements relate to the alignment of opto-electromechanical device 1 with respect to disk 2. These are address data @ indicating the disk area above which device 1 is placed, and data of alignment error Δ of device 1 with respect to the followed disk track, that is, too laterally offset from the track or again too close to or too far away from the track so that the light spot formed on the disk is not perfectly clear. Analog alignment data signals @ and Δ are transmitted to servo unit 20 which analyzes them and provides in return control signals cmd to the opto-electromechanical device to properly realign device 1 if necessary. Another element provided by processing unit 21 is an analog read data signal d which is demodulated and decoded by read unit R. The last element provided by processing unit 21 is a reference clock signal Ck known as a "wobble" signal. The period of reference clock Ck substantially corresponds to a multiple or to a sub-multiple of the duration of the passing under the sensor of a portion of the disk corresponding to a bit when the disk is rotating, or in other words, of the duration of overflight by the image sensor of a data bit written on disk 2. Reference clock signal Ck is transmitted to write unit W which transmits a digital data signal D to be written with a rate corresponding to the frequency of reference clock signal Ck.

As disk read and write speeds increase, more and more failures of the previously-described device can be observed. Such failures especially occur in devices using the most modern technologies known as "blue ray". The encountered failures mainly are write errors.

SUMMARY OF THE INVENTION

An object of the present invention is to provide a disk read and/or write device which is functional whatever the write or read speed.

Another object of the present invention is to provide such a device of simple structure.

To achieve these and other objects, the present invention provides a device for reading from and/or writing on a rotating disk comprising a mobile opto-electromechanical device placed above the disk and connected to a motherboard via a set of electric wires. The opto-electromechanical device comprises actuators, a laser diode, photodetectors, and an electronic circuit, each photodetector providing the electronic circuit with an analog electric signal proportional to the received light signal, the electronic circuit controlling the diode and the actuators. The electronic circuit comprises an analog-to-digital converter digitizing the analog electric signals coming from the photodetectors and transmitting the digitized signals to a digital processing unit providing data of alignment of the opto-electromechanical device with respect to the disk, and a reference clock signal having its period substantially corresponding to a multiple or to a sub-multiple of the time period corresponding to the overflight by the opto-electromechanical device of a bit of the disk.

According to an embodiment of the present invention, the electronic circuit further comprises a synchronization unit receiving said reference clock signal and a signal of digital data to be written coming from the motherboard and providing a synchronized digital data signal intended for the laser diode.

According to an embodiment of the present invention, in a write phase, the digital processing unit provides a digital data signal corresponding to the data written on the disk.

According to an embodiment of the present invention, said alignment data are an address indicating the disk area above which the opto-electromechanical device is located and data of alignment error with respect to the followed disk track.

According to an embodiment of the present invention, said alignment data are transmitted in series over one of said electric wires to a servo unit placed on the motherboard, the servo unit analyzing the alignment data and providing in return control signals intended for the actuators of the opto-electromechanical device.

According to an embodiment of the present invention, the electronic circuit of the opto-electromechanical device further comprises a control signal grouping unit receiving "main" control signals coming from the servo unit of the motherboard and "adjustment" control signals provided by the processing unit, the control signal grouping unit controlling the actuators.

According to an embodiment of the present invention, the digital data signals read and to be written transit via two interfaces placed on the motherboard and on the opto-electromechanical circuit, the two interfaces being connected by one of said electric wires, the interfaces ensuring the flowing in one direction or the other of a digital data signal.

According to an embodiment of the present invention, the motherboard comprises a read unit which transmits an audio and/or visual signal after demodulation and decoding of the digital data signal provided by the opto-electromechanical device and transmitted via one of said electric wires.

According to an embodiment of the present invention, the motherboard comprises a write unit receiving an audio and/or visual signal and performing a coding and a modulation of this signal to provide said signal of digital data to be written.

According to an embodiment of the present invention, the electronic circuit of the opto-electromechanical device comprises means for demodulating the digital data signal provided by the processing unit and means for modulating the signal of digital data to be written coming from the motherboard.

The present invention also provides an electronic circuit intended to control a laser diode and actuators of a mobile opto-electromechanical device placed above a disk and receiving analog electric signals provided by a set of photodetectors of the opto-electromechanical device. The circuit comprises an analog-to-digital converter digitizing the analog electric signals coming from the photodetectors and a digital processing unit receiving digitized signals from said converter and providing data of alignment of the opto-electromechanical device with respect to the disk and a reference clock signal having its period substantially corresponding to a multiple or to a sub-multiple of the duration corresponding to the overflight by the opto-electromechanical device of a bit of the disk.

The present invention also provides a reader and/or a recorder of digital disks on an optical support, for example, at the "CD","DVD", "Blueray", or "HD-DVD" format, comprising a device such as previously defined.

The foregoing and other objects, features, and advantages of the present invention will be discussed in detail in the following non-limiting description of specific embodiments in connection with the accompanying drawings.

DETAILED DESCRIPTION

Figure 1:
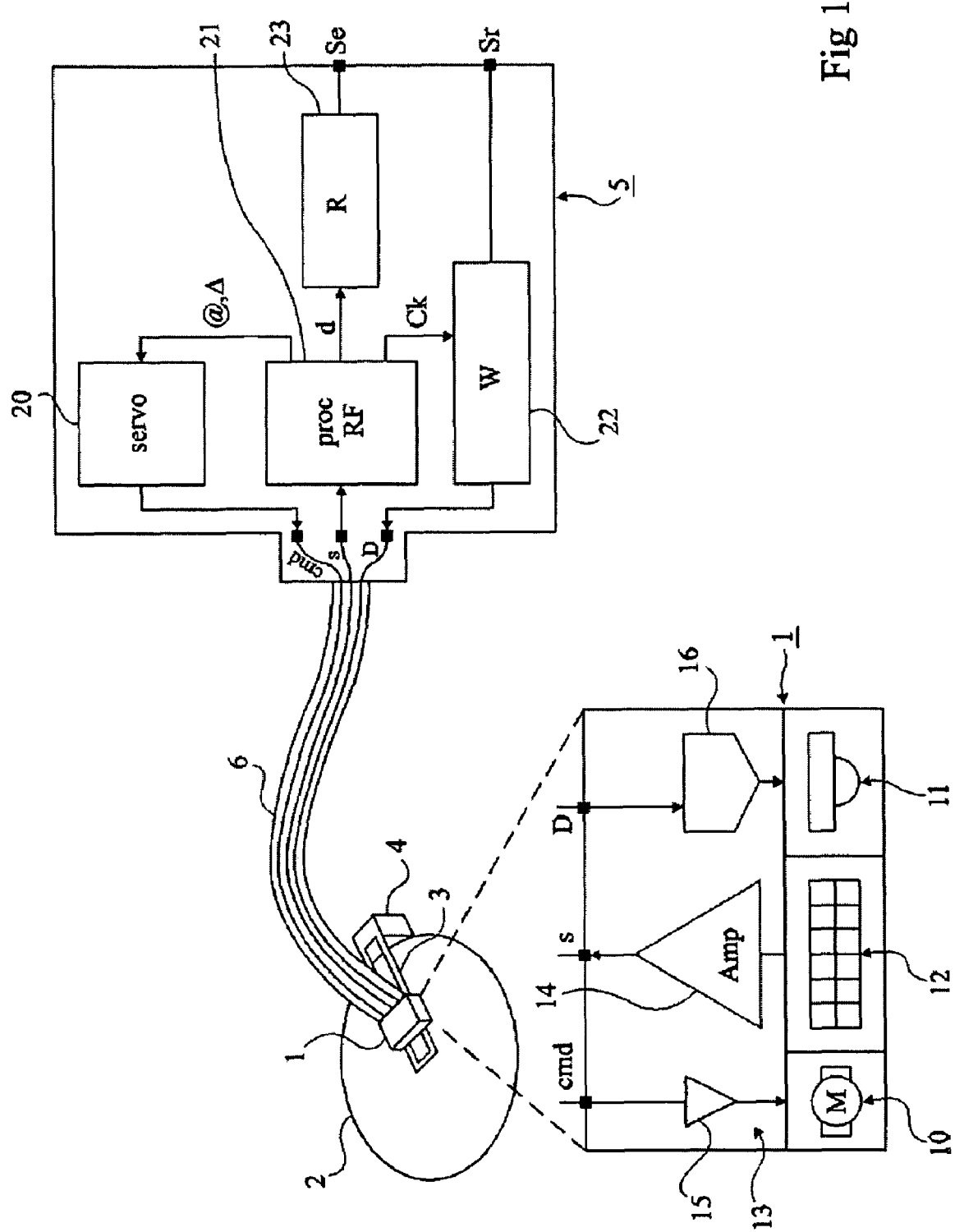
FIG. 1 is a diagram, previously described, of a known disk read and/or write device.

In the device previously described in relation with FIG. 1, the present inventors have detected problems of parasitic couplings between the signals transiting on electric wires of the flexible strip, especially in a write phase. A digital data signal D transits in one direction, from motherboard 5 to opto-electromechanical device 1, and analog signals s transit in the other direction, from device 1 to motherboard 5. Digital data signal D exhibits a frequency on the order of from 500 MHz to 1 GHz and the amplitude of its voltage excursion is on the order of 1 volt. Analog electric signals s have, as for them, a frequency spectrum ranging up to 100 MHz and their maximum voltage excursion is much smaller, on the order of a few hundreds of mV. By parasitic capacitive coupling, the significant fast variations of digital data signal D induce voltage variations on analog signals s that can reach from 40 to 50 mV. The signal-to-noise ratio of analog signal s is extremely low. The analysis of analog signals s to which interference has been caused by the processing unit provides alignment data @ and Δ which are erroneous. This generates in the end a bad alignment of the laser diode above the disk. Further, reference clock signal Ck provided by processing unit 21 is also tainted with interference. Accordingly, the synchronization of signal D of digital data to be written is not correct, which results in write errors.

Thus, a parasitic capacitive coupling causes a decrease in the signal-to-noise ratio of the transmitted analog signals, and accordingly an improper generation of signals of alignment control and of synchronization of the data to be written.

A way to decrease the parasitic coupling between the electric wires connecting the motherboard and the opto-electromechanical device comprises improving the electric isolation of the wires. For this purpose, they may be spaced apart from one another or two flexible strips may be provided, the signals transiting from the device to the motherboard being placed on one tape and the signals transiting in the other direction being placed on the other tape. This however requires using a wider flexible strip or several flexible strips, which is more expensive and more bulky.

A way to increase the signal-to-noise ratio of analog signal s coming from the image sensor is to increase the amplitude of the voltage variations of this signal by means of a more powerful amplifier 14. However, such a solution has several disadvantages. The consumed electric power is much greater. Further, the increase in the excursion of the analog signals causes clipping and distortion phenomena.

To cure these failures, the present invention provides processing analog signals provided by the image sensor by means of a "digital" device placed on the opto-electromechanical device. This digital device is formed of an analog-to-digital converter and of a digital processing unit. The digitizing of the signals provided by the image sensor and their digital processing causes a slight decrease in the processing quality as compared with an "analog" processing such as that performed by processing unit 21 of the device previously described in relation with FIG. 1. However, for a substantially identical functionality, a digital processing unit is much more compact and requires much less power than an "analog" processing unit. A digital processing unit may accordingly be advantageously placed in the electronic circuit placed on the opto-electromechanical device. The digital processing unit only provides relatively low-frequency digital signals. Since digital signals are much less sensitive to parasitic capacitive couplings between the electric wires of the flexible strip, this enables in the end widely compensating for the quality difference between an analog processing unit and a digital processing unit, as will appear hereafter.

Figure 2:
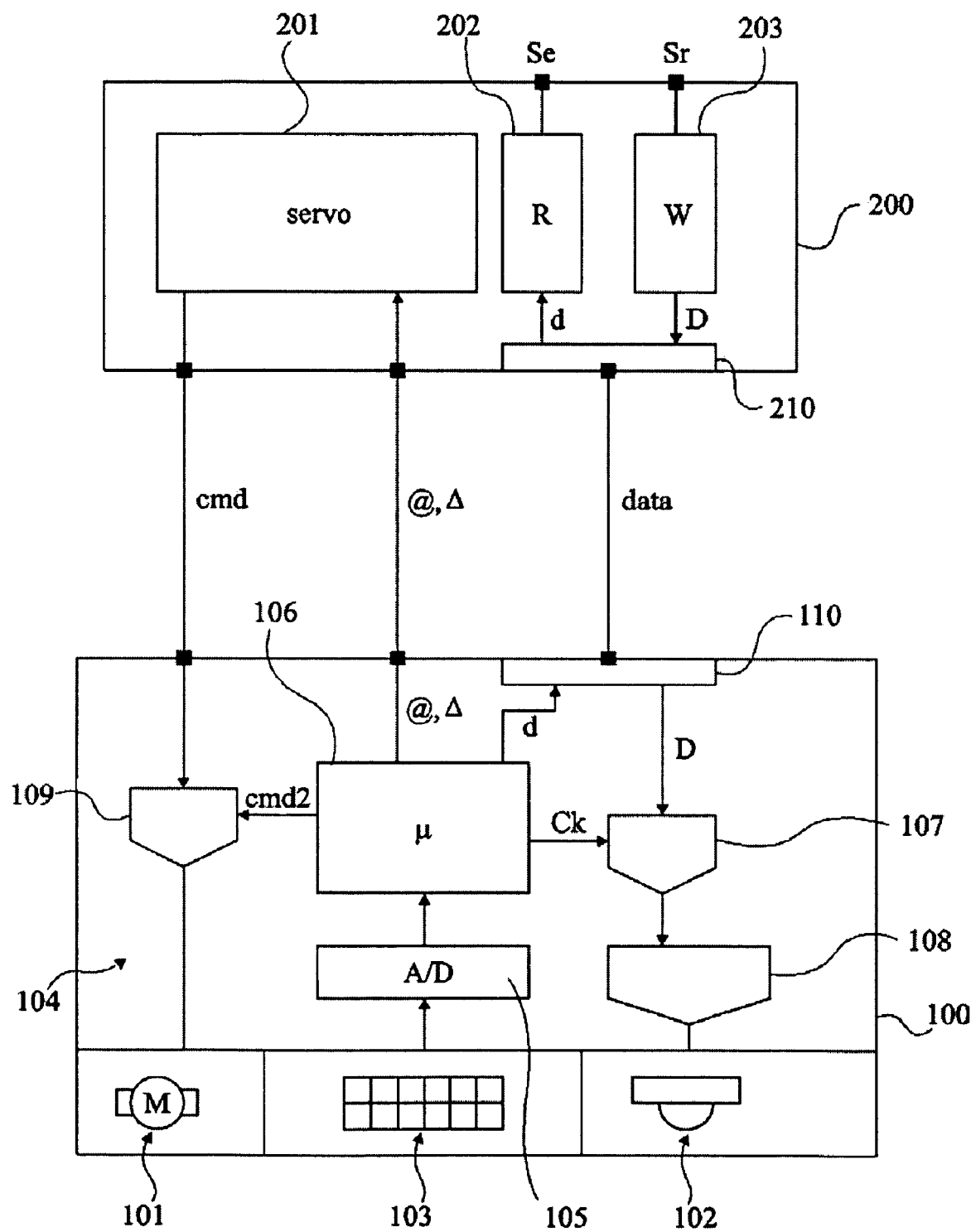
FIG. 2 is a diagram of a disk read and/or write device according to the present invention.

FIG. 2 is a diagram of a disk read and/or write device according to the present invention. The device comprises an opto-electromechanical device 100 and a motherboard 200 connected by electric wires placed on a flexible strip, not shown. As previously, opto-electromechanical device 100 comprises actuators 101, a laser diode 102, and an image sensor 103, all three connected to an electronic circuit 104. Opto-electromechanical device 100 is as previously placed on rails above a disk, the disk rotating on reading or writing.

According to an aspect of the present invention, the analog electric signals provided by each of the photodetectors of image sensor 103 are digitized by an analog-to-digital converter 105, then transmitted to a digital processing unit 106 which provides a set of digital signals. Processing unit 106 provides alignment information, that is, an address @ indicating the disk area above which device 100 is placed, and data Δ of alignment errors with respect to the followed disk track. Further, processing unit 106 provides a reference clock signal Ck. A period of reference clock signal Ck corresponds to a multiple or to a sub-multiple of the duration of overflight by image sensor 103 of a track portion of the rotating disk placed under device 100 corresponding to a data bit. Further, in a reading, processing unit 106 provides a digital data signal d indicating the data written on the disk.

For the embodiment described in FIG. 2, alignment data @ and Δ are transmitted to a servo unit 201 of motherboard 200. In this example of embodiment of the present invention, the alignment data are transmitted in series over a single electric wire. Servo unit 201 analyzes the alignment data and provides in return a control signal cmd intended for actuators 101 of device 100.

Further, on reading, digital data signal d provided by processing unit 106 is transmitted to a read unit R 202 of motherboard 200 via two interfaces 110 and 210 respectively placed on opto-electromechanical device 100 and on motherboard 200. Read unit 202 demodulates and decodes the received digital data signal d and outputs an audiovisual signal Se.

Further, motherboard 200 comprises a write unit 203 that can receive an audiovisual signal Sr. In a write phase, write unit 203 codes and modulates the received signal Sr before sending it in the form of a digital data signal D to opto-electromechanical device 100 via two interfaces 110 and 210. A synchronization unit 107 placed on device 100 receives digital data signal D to be written as well as reference clock signal Ck coming from processing unit 106 and provides a synchronized data signal to a regulation/amplification unit 102 which provides an adequate write control signal to laser diode 108 in the form of a series of current levels, the current level being a function of the value to be written, the writing of a "1" for example requiring a high intensity.

In the embodiment shown in FIG. 2, servo unit 201 of motherboard 200 only transmits main alignment control signals, the "adjustment" control signals of the placing above a track being directly provided by processing unit 106. A control signal grouping unit 109 receives control signals cmd coming from servo unit 201 and control signals cmd2 coming from processing unit 106 and, after synthesis, controls actuators 101.

Further, in the device shown in FIG. 2, interfaces 110 and 210 are connected to each other by a single wire on which transits either the read digital data signal d, or the digital data signal D to be written. The use of a single electric wire to transmit data in one direction or in the other enables reducing the number of wires of the flexible strip connecting the device and the motherboard and accordingly enables reducing the size and the cost of the flexible strip.

In the device according to the present invention, alignment data @ and Δ provided by the processing unit are low-frequency digital signals. The sensitivity of these signals to parasitic capacitive couplings is low, conversely to analog signals transmitted in the known device shown in FIG. 1.

Further, the fact that the opto-electromechanical device only transmits digital signals advantageously enables providing multiplexing systems to serialize the data, control signals, or data to be transmitted, and accordingly to be able to use a reduced number of electric wires on the flexible strip connecting the opto-electromechanical device and the motherboard.

Moreover, the fact of performing the synchronization of the data to be written in the opto-electromechanical device due to the direct use of reference clock Ck by synchronization unit 107 enables completely eliminating the problems of synchronization of the digital data signal to be written.

An advantage of the device according to the present invention is that, conversely to the known device described in relation with FIG. 1, it operates with high read or write frequencies.

Of course, the present invention is likely to have various alterations, improvements, and modifications which will readily occur to those skilled in the art. In particular, it may be provided to perform the modulation and the demodulation of the digital data signal on the electronic circuit placed on the opto-electromechanical device. This enables decreasing the frequency of the digital signals transiting between the motherboard and the opto-electromechanical device, and accordingly making them less sensitive to parasitic capacitive couplings.

Further, the digital processing unit placed on the opto-electromechanical device may be provided to be programmable to adapt its processing functions to the disk type, to the read and/or write speed, or to other parameters.

Moreover, it may be provided to include in the electronic circuit placed in the opto-electromechanical device a unit for regulating the light intensity of the laser diode in write phases. Such a regulation unit analyzes the light signals received by the image sensor to detect whether the reflectivity of the bits written at "0" or at "1" is correct. If such is not the case, then this regulation device controls the regulation/ amplification unit so that it modifies the current levels of the laser diode.

Besides, the device of the present invention may apply to the reading or to the writing of a signal which is only audio or only visual.

Further, the electronic circuit of the opto-electromechanical device may be formed of several integrated circuits that may be placed in the same package.

Moreover, a read and/or write device according to the present invention may be placed in various equipments such as a computer, a CD or DVD reader and/or a recorder for private use.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for reading from and/or writing on a rotating disk comprising a mobile opto-electromechanical device placed above the disk and connected to a motherboard via a set of electric wires, the opto-electromechanical device comprising actuators, a laser diode, photodetectors, and an electronic circuit controlling the diode and the actuators, each photodetector providing an analog-to-digital converter of the electronic circuit with an analog electric signal proportional to the received light signal, wherein the electronic circuit comprises a digital processing unit receiving signals digitized by the analog-to-digital converter and providing data of alignment of the opto-electromechanical device with respect to the disk, and a reference clock signal having its period substantially corresponding to a multiple or to a sub-multiple of the time period corresponding to the overflight by the opto-electromechanical device of a bit of the disk, the electronic circuit further comprising a synchronization unit receiving said reference clock signal and receiving, in a write phase, a signal of digital data to be written coming from the motherboard, and providing, in a write phase, a synchronized digital data signal intended for the laser diode.

2. The device of claim 1, wherein, in a read phase, the digital processing unit provides a digital data signal corresponding to the data written on the disk.

3. The device of claim 2, wherein the digital data signals read and to be written transit via two interfaces placed on the motherboard and on the opto-electromechanical circuit, the two interfaces being connected by one of said electric wires, the interfaces ensuring the flowing in one direction or the other of a digital data signal.

4. The device of claim 2, wherein the motherboard comprises a read unit which transmits an audio and/or visual signal after demodulation and decoding of the digital data signal provided by the opto-electromechanical device and transmitted via one of said electric wires.

5. The device of claim 2, wherein the electronic circuit of the opto-electromechanical device comprises means for demodulating the digital data signal provided by the processing unit and means for modulating the signal of digital data to be written coming from the motherboard.

6. The device of claim 1, wherein said alignment data are an address indicating the disk area above which the opto-electromechanical device is located and data of alignment error with respect to the followed disk track.

7. The device of claim 1, wherein said alignment data are transmitted in series over one of said electric wires to a servo unit placed on the motherboard, the servo unit analyzing the alignment data and providing in return control signals intended for the actuators of the opto-electromechanical device.

8. The device of claim 7, wherein the electronic circuit of the opto-electromechanical device further comprises a control signal grouping unit receiving main control signals coming from the servo unit of the motherboard and adjustment control signals provided by the processing unit, the control signal grouping unit controlling the actuators.

9. The device of claim 1, wherein the motherboard comprises a write unit receiving an audio and/or visual signal and performing a coding and a modulation of this signal to provide said signal of digital data to be written.

10. A reader and/or a recorder of digital disks on an optical support, for example, at the "CD", DVD", "Blue ray", or "HD-DVD" format, comprising the device of claim 1.

11. An electronic circuit intended to control a laser diode and actuators of a mobile opto-electromechanical device placed above a disk and receiving analog electric signals provided by a set of photodetectors of the opto-electromechanical device, comprising:
an analog-to-digital converter digitizing the analog electric signals coming from the photodetectors;
a digital processing unit receiving digitized signals from said converter and providing data of alignment of the opto-electromechanical device with respect to the disk and a reference clock signal having its period substantially corresponding to a multiple or to a sub-multiple of the duration corresponding to the overflight by the opto-electromechanical device of a bit of the disk; and
a synchronization unit receiving said reference clock signal and receiving, in a write phase, a signal of digital data to be written, and providing, in a write phase, a synchronized digital data signal intended for the laser diode.

12. A mobile device for reading from and/or writing on a rotating disk, the mobile device placed above the disk and electrically connected to a motherboard, comprising:
one or more actuators;
a laser diode;
photodetectors; and
an electronic circuit to control the laser diode and the actuators, comprising:
a digital processing circuit receiving photodetector signals and providing data representative of alignment of the mobile device with respect to the disk, and a reference clock signal having a period corresponding to a multiple or to a submultiple of a time period corresponding to overflight by the mobile device of a bit on the disk, and
a synchronization unit receiving said reference clock signal and receiving, in a write phase, a digital data signal to be written on the disk and providing a synchronized digital data signal to the laser diode.

13. A mobile device as defined in claim 12, wherein, in a read phase, the digital processing circuit provides a digital data signal corresponding to data written on the disk.

14. A mobile device as defined in claim 12, wherein the electronic circuit further comprises a control signal grouping unit receiving main control signals from the motherboard and adjustment control signals provided by the digital processing unit, the control signal grouping unit controlling the actuators.

15. A system for reading from and/or writing on a rotating disk, comprising:
a motherboard including a servo unit; and
a mobile device placed above the disk and electrically connected to the motherboard, the mobile device comprising one or more actuators, a laser diode, photodetectors and an electronic circuit to control the laser diode and the actuators, the electronic circuit comprising
a digital processing circuit receiving photodetector signals and providing data representative of alignment of the mobile device with respect to the disk, and a reference clock signal having a period corresponding to a multiple or to a submultiple of a time period corresponding to overflight by the mobile device of a bit on the disk, and
a synchronization unit receiving said reference clock signal and receiving, in a write phase, a digital data signal to be written on the disk and providing a synchronized digital data signal to the laser diode.

16. The system of claim 15, wherein, in a read phase, the digital processing unit provides a digital data signal corresponding to data written on the disk and provided by the photodetectors.

17. The system of claim 16, wherein the motherboard includes a read unit which transmits an audio and/or visual signal after demodulation and decoding of the digital data signal provided by the mobile device.

18. The system of claim 15, wherein the alignment data is transmitted to the servo unit on the motherboard, the servo unit analyzing the alignment data and providing control signals to the actuators.

19. The system of claim 18, wherein the electronic circuit further comprises a control signal grouping unit receiving main control signals from the servo unit and adjustment control signals provided by the digital processing circuit, the control signal grouping unit controlling the actuators.

20. The system of claim 15, wherein the motherboard includes a write unit receiving an audio and/or visual signal and performing coding and modulation of the audio and/or visual signal to provide the digital data signal to be written.

21. A method for reading from and/or writing on a rotating disk, comprising:
providing a mobile device placed above the disk and electrically connected to a motherboard, the mobile device including one or more actuators, a laser diode, photodetectors and an electronic circuit to control the laser diode and the actuators, the electronic circuit including a digital processing circuit and a synchronization unit;

the digital processing circuit receiving photodetector signals and providing data representative of alignment of the mobile device with respect to the disk, and a reference clock signal having a period corresponding to a multiple or to a submultiple of a time period corresponding to overflight by the mobile device of a bit on the disk; and the synchronization unit receiving the reference clock signal and receiving, in a write phase, a digital data signal to be written on the disk and providing a synchronized digital data signal to the laser diode.

* * * * *